United States Patent
Weber et al.

(10) Patent No.: US 10,978,969 B2
(45) Date of Patent: Apr. 13, 2021

(54) SHORT-CIRCUIT BRAKING OF AN LLM

(71) Applicant: B&R INDUSTRIAL AUTOMATION GMBH, Eggelsberg (AT)

(72) Inventors: Andreas Weber, Salzburg (AT); Leopold Faschang, Eggelsberg (AT); Stefan Brucker, Salzburg (AT)

(73) Assignee: B&R INDUSTRIAL AUTOMATION GMBH, Eggelsberg (AT)

(*) Notice: Subject to any disclaimer, the term of this patent is extended or adjusted under 35 U.S.C. 154(b) by 0 days.

(21) Appl. No.: 16/440,154

(22) Filed: Jun. 13, 2019

(65) Prior Publication Data
US 2019/0386588 A1    Dec. 19, 2019

(30) Foreign Application Priority Data
Jun. 14, 2018  (EP) .................................... 18177762

(51) Int. Cl.
| | | |
|---|---|---|
| H02P 3/00 | (2006.01) | |
| H02P 3/06 | (2006.01) | |
| H02K 11/21 | (2016.01) | |
| H02K 11/33 | (2016.01) | |
| H02K 41/02 | (2006.01) | |

(52) U.S. Cl.
CPC ............... *H02P 3/06* (2013.01); *H02K 11/21* (2016.01); *H02K 11/33* (2016.01); *H02K 41/02* (2013.01)

(58) Field of Classification Search
USPC ....................................................... 318/560
See application file for complete search history.

(56) References Cited

U.S. PATENT DOCUMENTS

| | | | |
|---|---|---|---|
| 3,768,417 A | | 10/1973 | Thornton et al. |
| 4,348,618 A | * | 9/1982 | Nakamura ............ B60L 15/005 104/290 |
| 4,836,344 A | | 6/1989 | Bolger |
| 5,125,347 A | * | 6/1992 | Takahashi ............... B60L 13/03 104/298 |
| 6,876,107 B2 | | 4/2005 | Jacobs |
| 10,181,780 B2 | | 1/2019 | Achterberg et al. |

(Continued)

FOREIGN PATENT DOCUMENTS

| | | |
|---|---|---|
| AT | 518 721 | 12/2017 |
| DE | 2 235 705 | 2/1973 |

(Continued)

OTHER PUBLICATIONS

Europe Search Report/Office Action conducted in counterpart Europe Appln. No. 18 17 7 762.4 (dated Jan. 7, 2019) (w/ machine translation).

*Primary Examiner* — Bentsu Ro
(74) *Attorney, Agent, or Firm* — Greenblum & Bernstein, P.L.C.

(57) ABSTRACT

In order to enable safe deceleration of a transport unit of a long-stator linear motor, wherein in a normal mode a plurality of drive coils of the long-stator linear motor are energized in such a way that a magnetic field coupled to a transport unit is moved along a direction of motion in order to move the transport unit along the direction of motion, according to the invention a switching to a controlled short-circuit mode is performed during the braking operation of the transport unit, in which at least some of the drive coils are short-circuited at least over a first time interval in said mode.

15 Claims, 4 Drawing Sheets

(56) References Cited

U.S. PATENT DOCUMENTS

| | | |
|---|---|---|
| 10,250,176 B2 | 4/2019 | Faschang et al. |
| 2006/0220623 A1 | 10/2006 | Andruzzi et al. |
| 2008/0115372 A1 | 5/2008 | Vogel et al. |
| 2012/0193172 A1* | 8/2012 | Matscheko ......... B66B 11/0407 187/289 |
| 2013/0074724 A1 | 3/2013 | King et al. |

FOREIGN PATENT DOCUMENTS

| | | |
|---|---|---|
| EP | 0 289 868 | 11/1988 |
| EP | 0 294 541 | 12/1988 |
| WO | 2004/103792 | 12/2004 |
| WO | 2013/143783 | 10/2013 |

\* cited by examiner

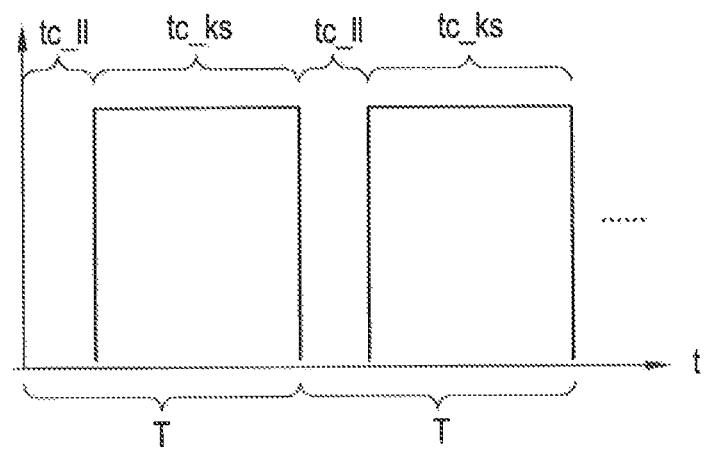
Fig. 5
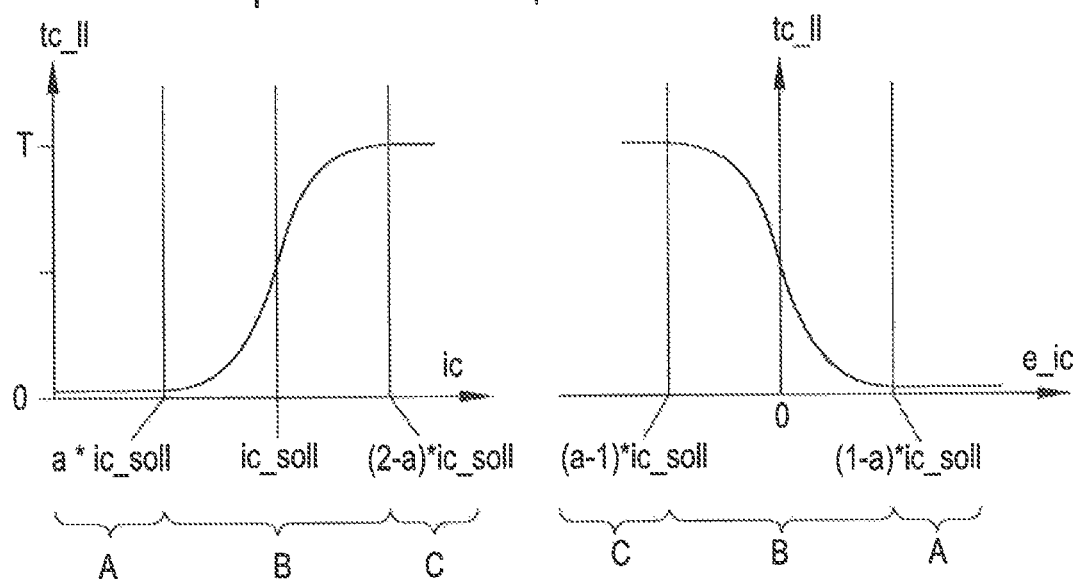
Fig. 6a  Fig. 6b
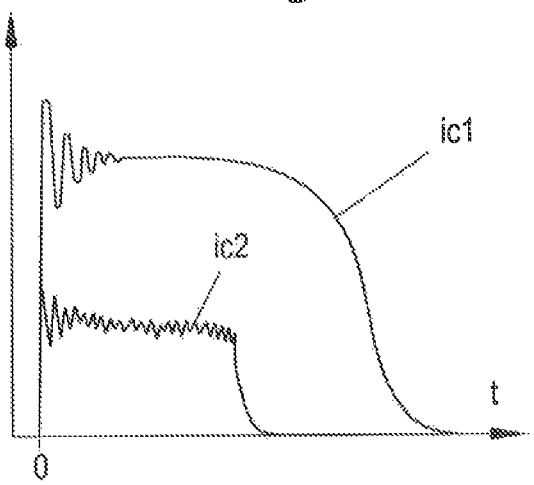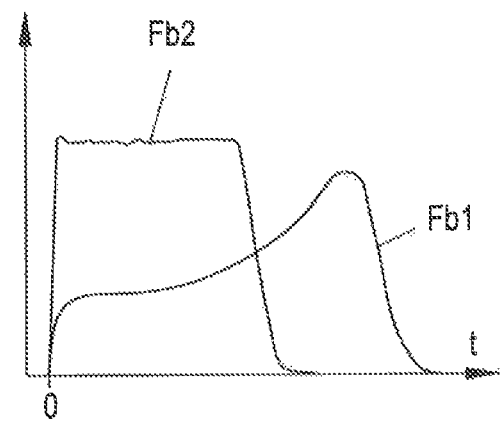
Fig. 7

SHORT-CIRCUIT BRAKING OF AN LLM

CROSS-REFERENCE TO RELATED APPLICATIONS

The present application claims priority under 35 U.S.C. § 119(a) of European Patent Application No. 18177762.4 filed Jun. 14, 2018, the disclosure of which is expressly incorporated by reference herein in its entirety.

BACKGROUND

1. Field of the Invention

Embodiments relate to a method for driving a plurality of drive coils of a long-stator linear motor, wherein in normal operation the drive coils are energized such that a magnetic field coupled to a transport unit is moved along a direction of motion to move the transport unit along the direction of motion. The subject of the invention also relates to a long-stator linear motor having a plurality of drive coils and at least one transport unit, wherein the drive coils are energized by an LLM control system which is controlled by a coil controller such that a magnetic field coupled to the transport unit is moved along a direction of motion in order to move the transport unit along the direction of motion.

2. Discussion of Background Information

In order to meet the requirements of modern, flexible logistics units, long-stator linear motors (LLMs) are increasingly being used as a replacement for conventional continuous conveyors, for example rotary-to-linear conversion units such as rotary motors on a conveyor belt. Long-stator linear motors are characterized by a better and more flexible utilization over the entire working range, Thus the ranges of the speed and acceleration can be exploited from zero to the maximum. Other advantages which must be mentioned include individual regulation or control of the movable transport units (shuttles), improved energy utilization, reduction of maintenance costs due to the lower number of wear parts, ease of replacement of transport units, efficient monitoring and easier fault detection, and optimization of the current consumed resulting from the elimination of current gaps.

A stator of a long-stator linear motor consists of a plurality of drive coils disposed next to one another in the direction of motion of the transport units, the coils together forming the stator of the long-stator linear motor. These drive coils are controlled individually or in groups, and it is often desirable or necessary in the operation of the long-stator linear motor to change the polarity, i.e. the current direction of the drive coils, By controlling the drive coils, a moving magnetic field is generated which cooperates with excitation magnets (usually permanent magnets) on a transport unit of the LLM in order to generate a drive force acting on the transport unit and thus move the transport unit along the stator. To energize the drive coils for generating the magnetic field, an operating voltage is usually provided between a first operating potential and a second operating potential. Such long-stator linear motors are well known in various embodiments, for example from WO 2013/143783 A1, U.S. Pat. No. 6,876,107 B2, US 2013/0074724 A1 or WO 2004/103792 A1, to name only a few.

One possibility for energizing drive coils and allowing a change in the polarity of the coil voltage would be the use of a full bridge, as disclosed in US 2006/0220623 A1. The operating voltage is applied to the first and to the second branch of the full bridge, the drive coil being placed in the shunt branch of the full bridge. By suitable control of the four switches (bipolar transistors, MOSFETs, IGBTs, etc.) of the full bridge, a target coil voltage, i.e. a voltage predetermined by a coil controller system, can be applied to the drive coils at the desired polarity and magnitude. To be able to control the drive coils individually, each drive coil must be provided with a full bridge. However, this means that four switches are required per drive coil. Of course, when there is a high number of drive coils for an LLM stator, high costs and a high circuit complexity result due to the large number of switches.

AT 518 721 A1 discloses the use of half bridges instead of full bridges, wherein a midpoint of the half bridges is connected to a first terminal of drive coils, respectively. The second terminals of the drive coils are connected to a control point and a control unit regulates an actual potential at the control point to a predetermined potential. Thus, despite the use of half bridges, a positive and a negative coil voltage can be applied to the drive coils.

It may be desirable to quickly decelerate a transport unit. In some exceptions, such as when the safety of persons in the vicinity of the long-stator linear motor is at risk, overloading of the system, voltage overloads and loss of position or speed information, for example, it may be necessary to initiate an immediate emergency stop, whereby all or part of the transport units (e.g. all transport units of a certain sector) must be brought to a standstill. For example, US 2012/193172 discloses special brake coils mounted on a linear motor for generating a braking effect. However, such additional brake coils increase the design complexity and the cost of the long-stator linear motor and are therefore undesirable.

SUMMARY

Embodiments easily enable a safe deceleration of a transport unit of a long-stator linear motor.

Aspects are achieved in embodiments by switching, during a braking operation of the transport unit, to a controlled short-circuit mode in which at least some of the drive coils are short-circuited at least over a first time interval. The object is also achieved by a short-circuit controller which, during a braking operation of the transport unit, short-circuits at least some of the drive coils at least over a first time interval. After a braking operation of a transport unit has been initiated, the relevant drive coils are usually de-energized (which is basically equal to idling) in order to no longer actively move the transport unit. However, the transport unit continues to move along the stator of the long-stator linear motor, slowly decelerating to a standstill (due to the desired low-friction bearing or propulsion of the transport units along the transport route) unless suitable action is taken, which is undesirable since the transport units usually should be brought to a standstill very rapidly. As a transport unit continues to move, a moving magnetic field is generated by the excitation magnets themselves. This magnetic field moves with the transport unit along the stator and thus also has the speed of the transport unit. This magnetic field also interacts with the drive coils of the stator, which would have no effect when the terminals of the drive coils are open. However, the drive coils, which are magnetically coupled to the transport unit, each induce a coil short-circuit current via an electro-magnetic force (EMF) when the terminals are short-circuited. This coil short-circuit current counteracts the magnetic field caused by the transport unit according to Lenz's rule, whereby the transport unit is decelerated relatively quickly. Thus, the short circuit of at least a portion of the drive coils is preferably maintained during the entire braking operation, i.e. until the transport unit is at a standstill. This would mean that the first time interval extends over the entire braking process, wherein the short circuit can be canceled after the transport unit has stopped. If the first time interval is selected shorter, then the transport unit can be braked at least to a non-critical speed from which the transport unit can then "roll out", for example.

Advantageously, in the controlled short-circuit mode, the at least some of the drive coils are operated at idle at least over a second time interval. In the event of a short circuit, the relevant coil terminals are closed; when idling, the relevant coil terminals are opened. With a suitable choice of the first and second time interval, the short-circuit current (as the sum of the respective current coil short-circuit currents) can be controlled such that a larger current component in the direction of force (i.e. in a Cartesian field-oriented dq-coordinate system in the q direction) is achieved. Thus, the proportion of the short-circuit current opposite to the field direction for drive motion is increased, whereby a braking effect that is greater than that in a permanent short circuit is achieved and thus the transport unit comes to a standstill even faster. Thus, even at lower short-circuit currents a higher braking force and thus a better and faster deceleration of the transport unit can be achieved. In addition, a lower current load and a lower field weakening are achieved. A smaller field weakening also requires a lower normal force decrease, whereby under certain circumstances the transport unit can be prevented from lifting off the stator at a specific speed, for example in a plot region of the transport path.

Advantageously, a total short-circuit current flowing through the drive coils is determined, and a target short-circuit current with a maximum short-circuit current component icq forming the driving force is determined by a predetermined relationship. In the controlled short-circuit mode, in a short-circuit phase in which the short-circuit current is less than the target short-circuit current, the at least some of the drive coils can be short-circuited. In an idling phase, in which the short-circuit current reaches or exceeds the target short-circuit current, the at least some of the drive coils can be operated at idle.

However, in the controlled short circuit mode, in a short circuit phase in which the short circuit current is less than the target short circuit current multiplied by a factor, the at least some of the drive coils are short circuited. In a mixed phase, in which the short-circuit current is equal to or exceeds the target short-circuit current multiplied by a factor, the at least some of the drive coils are operated alternately in short-circuit and in idling. In an idling phase, in which the short-circuit current is equal to or exceeds the target short-circuit current multiplied by the term 2 minus factor a, the at least some of the drive coils are operated at idle.

Preferably, the given relationship corresponds to f:

$$\text{ic\_soll} = \frac{1}{\sqrt{2}} \frac{\Psi}{L} \text{ic\_soll} = \frac{1}{\sqrt{2}} \frac{\Psi}{L},$$

wherein Ψ corresponds to the main flow and L the unsaturated inductance and the relationship can be derived from the stator voltage equation in a multi-phase feed.

In the mixed phase, the at least some of the drive coils can in each case be operated alternately short-circuited over a short-circuit interval and be operated over an idle interval at idle, wherein the duration of the short-circuit interval being determined for the duration of the idle interval and advantageously calculated using a third-order polynomial with an error deviation.

Furthermore, a factor of 0.85 can be chosen, which causes a particularly good braking effect, as has been confirmed in practice.

It is particularly advantageous if only the drive coils magnetically coupled to the transport unit are switched to the controlled short-circuit mode. Thus, not all drive coils of the entire long-stator linear motor must be switched to the short circuit mode. Thus, for example, only one transport unit can be braked as needed, whereas the other transport units are not affected by the braking process.

For this purpose, the drive coils magnetically coupled to the transport unit can be determined by means of a position sensor. This can be advantageous if position sensors are already provided on the long-stator linear motor anyway.

However, the drive coils magnetically coupled to the transport unit can also be detected via a coil short-circuit current induced in each respective drive coil. This induced coil short-circuit current suggests a magnetic coupling with a transport unit.

Of course, other drive coils can be switched to the controlled short circuit mode if desired, for example a specific number of drive coils located in front of the transport unit in the direction of motion, etc.

The duration of the braking process, in addition to the choice of the first and second time interval, depends on the mass of the transport unit and on additional masses associated with the transport unit (cargo, workpiece, . . . ) and/or the speed of the transport unit. The energy that is released during the braking process is converted primarily into heat in the winding resistances (copper losses) and in the iron (predominantly eddy current losses).

A short circuit can mean different switch settings for different embodiments of an LLM control unit. If the LLM control unit has full bridges, as in US 2006/0220623 A1, each with four switches per drive coil, a full short circuit can be switched in during the controlled short circuit in the short-circuit phase or the short-circuit interval. However, if the LLM control unit has half bridges comprising one upper and one lower switch per drive coil (see AT 518 721 A1), the short circuit is modulated in the short circuit phase or the short circuit interval. This means that the upper switch of the half-bridge is switched through alternately with the lower switch of the half-bridge, preferably in a ratio of 50/50. However, the upper switch and the lower switch must not be switched through at the same time.

BRIEF DESCRIPTION OF THE DRAWINGS

The present invention is described in greater detail in the following with reference to FIGS. 1 to 7, which show exemplary, schematic and non-limiting advantageous embodiments of the invention. In the drawings:

FIG. 5 illustrates a typical switching pattern for the short-circuit interval and the idle interval;

FIGS. 6A and 6B are short-circuit interval plots against the short-circuit current and the error deviation; and FIG. 7 illustrates a temporal plot of a first and second short-circuit current of a plurality of coils and a first and second generated braking force.

DETAILED DESCRIPTION

Figure 1:
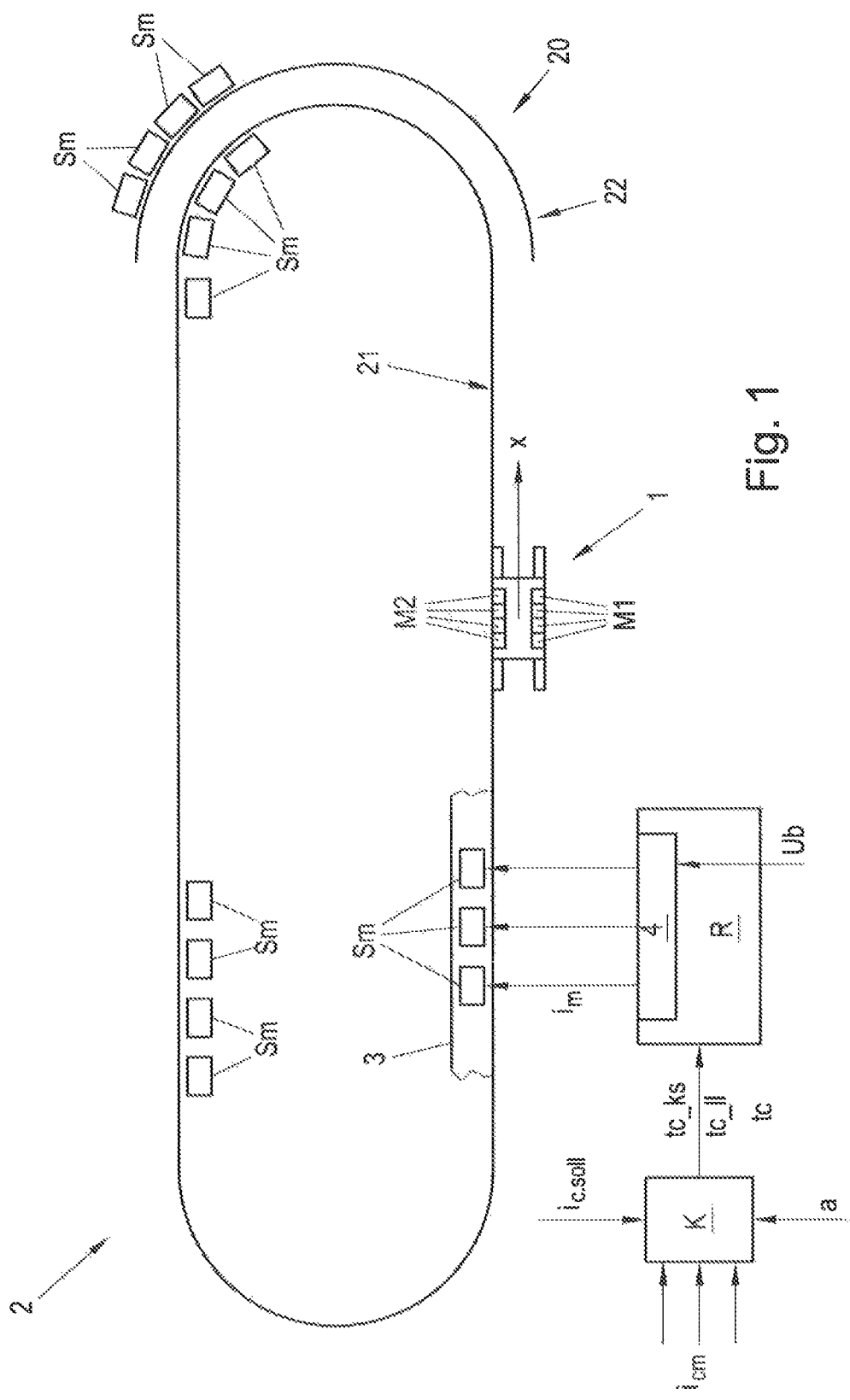
FIG. 1 illustrates a long-stator linear motor assembly.

FIG. 1 illustrates a simple example of a long-stator linear motor 2. The long-stator linear motor 2 is designed as a closed transport path 20. A plurality m of drive coils Sm are disposed on the transport path 20 in the direction of motion x of a transport unit 1 one after the other, the coils being energized in normal operation under control of a coil controller R (only shown for some drive coils Sm) each at a coil current $i_m$ in order to produce a moving magnetic field. In addition, an LLM control unit 4 is provided which is an integral part of the coil controller R here. Of course, the arrows marked with $i_m$ can only be seen schematically. The drive coils Sm can also be connected to the control unit in a different manner in order to supply the drive coils Sm with the coil current $i_m$, as shown by way of example below with reference to FIGS. 2A, 2B. Both the coil controller R and the LLM control unit 4 can be embodied as suitable hardware (also the same) and/or as software running on suitable hardware. The LLM control unit 4 has Sm full bridges VB (consisting of four switches) per drive coil or half bridges HB (consisting of two switches) and can also consist of a plurality of subunits, which can also be disposed directly on the drive coils Sm. Due to the switch positions of the switches of the full bridges VB or half bridges HB of the LLM control unit 4, in normal operation the drive coils Sm are supplied with the coil current $i_m$ or disconnected from the coil current $i_m$.

The drive coils Sm disposed next to one another in the direction of motion x are arranged on the transport path 20 on a stationary support structure 3 (only indicated in FIG. 1). The transport units 1 are moved along the transport path 20 in a direction of motion x, and are each guided and held in a suitable manner on the stationary transport path 20.

A transport unit 1 has laterally arranged first magnets M1 along the direction of motion x and, as shown in FIG. 1, can also have laterally arranged magnets M2 which can be located transverse to the direction of motion x relative to the first magnets M1 in a transverse direction. If the transport unit 1 has respective first magnets M1 and second magnets M2 on two sides, drive coils Sm can be suitably provided on both sides of the transport path 20 (viewed in the direction of motion x) which interact with the respective magnets M1, M2 to cause a movement of the transport units 1. For movement, it is preferable to supply only the drive coils Sm in the region of the magnets M1, M2 with power by the coil controller R, wherein this region can also comprise drive coils Sm which are located before and/or after the transport unit 1. Of course, more than one transport unit 1 can be moved along the transport path 20, wherein each transport unit 1 can be moved (in direction, position, speed and acceleration) by appropriately energizing the drive coils Sm near the transport unit 1 regardless of the other transport units 1. To determine the position of the transport unit 1 on the stator and thus the current coils Sm to be energized which are located along the transport path at the transport unit 1, current sensors can be provided, for example.

The transport path 20 may be arbitrarily shaped, depending on the application and need and may include closed and/or open sections. The transport path 20 does not have to lie in a plane, but can also be arbitrarily guided in space. Usually, a transport path 20 consists of several combined transport segments each having a number of drive coils Sm. Likewise, turnouts are known to guide a transport unit 1 from a first transport path 20 to a second transport path 20. As is known, the driving force required for the movement of the transport unit 1 is formed by the driving force-forming current component iq (q-component) of a stator current $i_A$. The stator current $i_A$ is a current vector with a q- and a d-component (normal force-forming current component) and is equal to the vectorial total current of all coil currents $i_m$ of the drive coils Sm acting on the transport unit 1. Thus, for the normal forward movement of the transport unit 1 the driving force-forming current component iq (q-component) is sufficient. The normal force not serving the non-forward-motion is formed from the normal force-forming current component id (d component) of the stator current $i_A$. In a long-stator linear motor, usually a plurality of drive coils Sm act simultaneously on the transport unit 1 in order to achieve a movement in the direction of motion x. If no d components are present, the driving force-forming current component iq is equal to the vectorial total current of all coil currents $i_m$ of the drive coils Sm acting on the transport unit 1. The driving force-forming current component iq calculated in the coil controller R must therefore be converted to the actual coil currents $i_m$ of the drive coils Sm and divided and applied thereto, which is well known. The basic operating principle of a long-stator linear motor 2 is well known, so that will not be discussed further here.

Figure 2A:
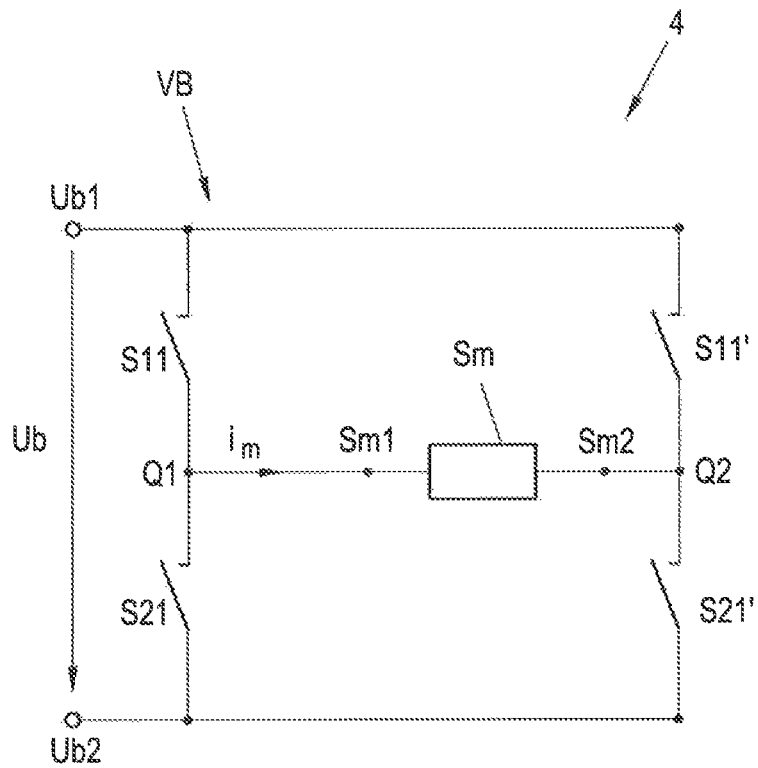
FIG. 2A illustrates a full bridge for controlling a drive coil.
Figure 2B:
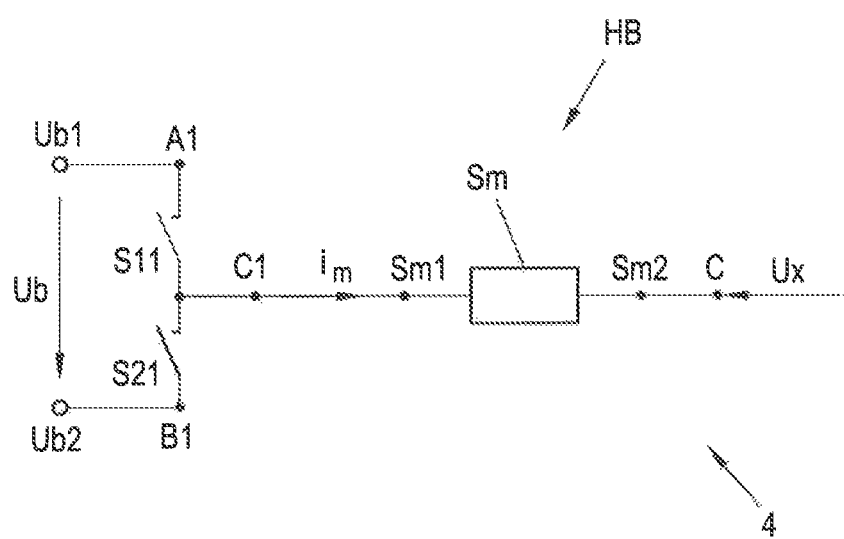
FIG. 2B illustrates a half-bridge for controlling a drive coil.

As part of a braking operation, a transport unit 1 can be braked by short-circuiting corresponding drive coils Sm, for example those cooperating with the transport unit 1, or all drive coils Sm, or for example those drive coils Sm arranged in the direction of motion, etc. For this purpose, for example, the switches of the full bridges VB/half bridges HB are brought by the LLM control unit 4 to the appropriate position, and this can be initiated by a short-circuit controller K. Of course, the short circuit can be generated in other ways, for example by a switch in parallel to the drive coils Sm. "Short-circuited" can mean a full short circuit when using full bridges in the LLM controller 4, FIG. 2A shows a full bridge VB for energizing a drive coil Sm with a coil current $i_m$. The drive coil Sm has a first coil terminal Sm1 and a second coil terminal Sm2. The full bridge VB consists of two main branches, wherein the first main branch consists of two switches S11, S21, which are connected in series to an operating voltage Ub formed by the difference between a first operating potential Ub1 and a second operating potential Ub2 at the input terminals of the full bridge VB. The second main branch also consists of two switches S11', S21' which are connected in series to the operating voltage Ub. Between the connection point of the first switch S11 and the second switch S21 of the first main branch is the first transverse connection Q1 for a shunt branch. Equivalently, between the connection point of the first switch S11' and the second switch S21' of the second main branch, the second transverse connection Q2 of the shunt branch is located. The first coil terminal Sm1 of the drive coil Sm is connected to the first cross terminal Q1, and the second coil terminal Sm2 of the drive coil Sm is connected to the second cross terminal Q2, By suitably controlling the switches S11, S21, S11', S21' using the LLM controller 4 (not shown here), the same electrical potential can be applied between the first coil terminal Sm1 and the second coil terminal Sm2 while the coil current $i_m$ is flowing. In the event of a full short circuit, switches S11 and S11' are thus through-connected (with open switches S21 and S21') or switches S21, S21' are through-connected (with open switches S11, S11').

Half-bridges HB can also be controlled by the LLM controller 4 in order to energize the drive coils Sm with a coil current $i_m$, for example as shown in FIG. 2 b. In this case, the second main branch of the full bridge VB is dispensed with, whereby the operating voltage Ub is present only at the first main branch, between the first input terminal A1 and the second input terminal B1 and the first switch S11 and second switch S21 connected in series therebetween. The connection point between the first S11 and the second switch S21 is referred to as the center point C1, and is connected to the first terminal Sm1 of the drive coil Sm. The second terminal L12 of the drive coil Sm is at an electrical potential Ux at a control point C, for example as predefined by a potential control unit. Usually, the second terminals Sm2 of all (not shown here) drive coils Sm are connected to the control point C and are controlled to the electrical potential Ux, which usually is equal to half the operating voltage Ub.

A direct short circuit of the drive coil Sm through the two switches S11 and S12 is not possible when using a half-bridge HB, since the switches S11 and S21 must never be closed at the same time. In order not to short-circuit the operating voltage Ub, a "PWM short-circuit" is therefore provided when using half-bridges HB. A PWM short-circuit means that in each case the upper switch S11 and the lower switch S21 of a half-bridge HB are alternately switched, for example by a 50/50 cycle over period T. Thus, the same potential Ux prevails at both terminals Sm1, Sm2 of drive coil Sm—analogous to the full bridge VB shown in FIG. 2A, in which, in the event of a full short circuit, both coil terminals Sm1, Sm2 are either at the first operating potential Ub1 or the second operating potential Ub2. When changing the closed/opened switch of a half-bridge HB, a minimum safety period can be maintained to remove any residual charge.

A PWM short circuit is at no time equal to a full short circuit, but can be interpreted as a short circuit over a time integral of the coil voltage over a switching cycle. Of course, the drive coils Sm concerned are no longer supplied with the coil current $i_m$ by the control unit R in this case. However, owing to the further movement in the direction of motion x, a coil short-circuit current icm arises in the drive coils Sm coupled to the transport unit 1 due to a voltage induced by an EMF (electro-magnetic force).

Figure 3:
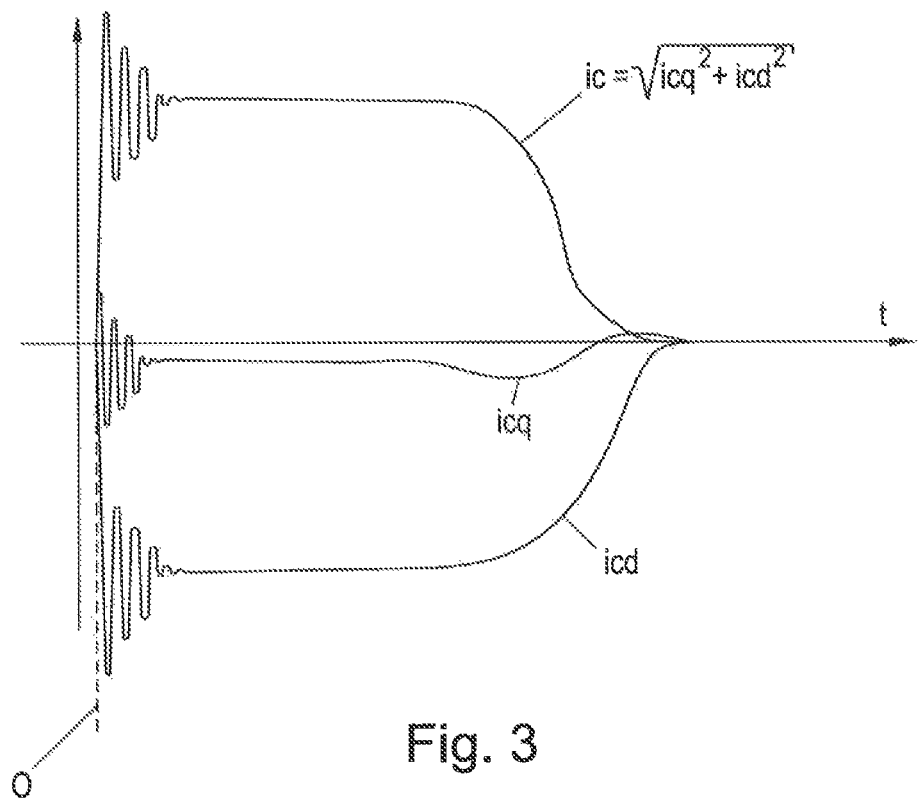
FIG. 3 illustrates a temporal plot of the torque-forming short-circuit current, the field-forming short-circuit current and the short-circuit current, combined by several covered coils.

Since the stator current $i_A$ (in the dq coordinate system) is equal to the vectorial total current of all coil currents in, the short-circuit current ic (in the dq coordinate system) also results as the vectorial total of the coil short-circuit currents icm. FIG. 3 shows the temporal plot of a short-circuit current ic at a permanent short circuit during a braking operation. It can be seen that from the braking time point O, the short-circuit current ic initially has a classic plot of a short-circuit current ic of a stator with oscillation behavior. Thus, after a subtransient plot, a transient plot occurs, whereupon an approximately constant plot follows, which in turn finally decreases and tends to zero. This decrease is caused by the fact that the driving electro-magnetic force (EMF) decreases since the speed of the transport unit 1 is already low at this time.

Also shown in FIG. 3 are the plot of the driving force-forming short-circuit current component icq and the field-forming short-circuit current component icd of the short-circuit current ic, i.e. that component which points in the field direction. In the same way, the driving force-forming short-circuit current component icq is responsible for the braking of transport unit 1, just as the driving force-forming current component iq is responsible for the movement of the transport unit 1 in the direction of motion x in normal operation. Therefore, it is desirable to additionally increase or maximize the driving force-forming short-circuit current component icq during a controlled short-circuit mode M. A suitable choice of the short-circuit and idling phases will facilitate this enlargement of the driving force-forming short-circuit current component icq.

An estimate of the relationship between the driving force-forming current component iq as a function of the total short-circuit current ic can be formed without requiring additional information regarding the position or angle. For this purpose, stator voltage equations derived for a multi-phase power supply are assumed. The stator equations are solved according to velocity and the steady state case (i.e. no changes over time, which in turn means zero velocity) assumed. Taking into account the relation $ic=\sqrt{icq^2+icd^2}$, the stator equations are solved according to $$iq = ic\sqrt{1 - ic^2\left(\frac{L}{\Psi}\right)^2}.$$

The flux of the permanent magnet $\Psi$ can be approximately assumed to be constant. The relationship thus determined is used in the force equation, whereupon the force equation is derived according to the short-circuit current ic. Setting the derived force equation to zero corresponds to an optimal relationship of driving force-forming current component iq to the total short-circuit current ic, i.e. a maximization of the driving force-forming current component iq. From this, the relationship f for the optimum target short-circuit current ic_soll can be derived:

$$ic\_soll = \frac{1}{\sqrt{2}}\frac{\Psi}{L}.$$

The optimum target short-circuit current ic_soll with a maximum driving force-forming short-circuit current component icq can thus be determined on the basis of the stator voltage equations according to the relationship f:

$$ic\_soll = \frac{1}{\sqrt{2}}\frac{\Psi}{L}$$

The corresponding values for the inductance L and the flux $\Psi$ can be determined by experiments, for example.

Figure 4:
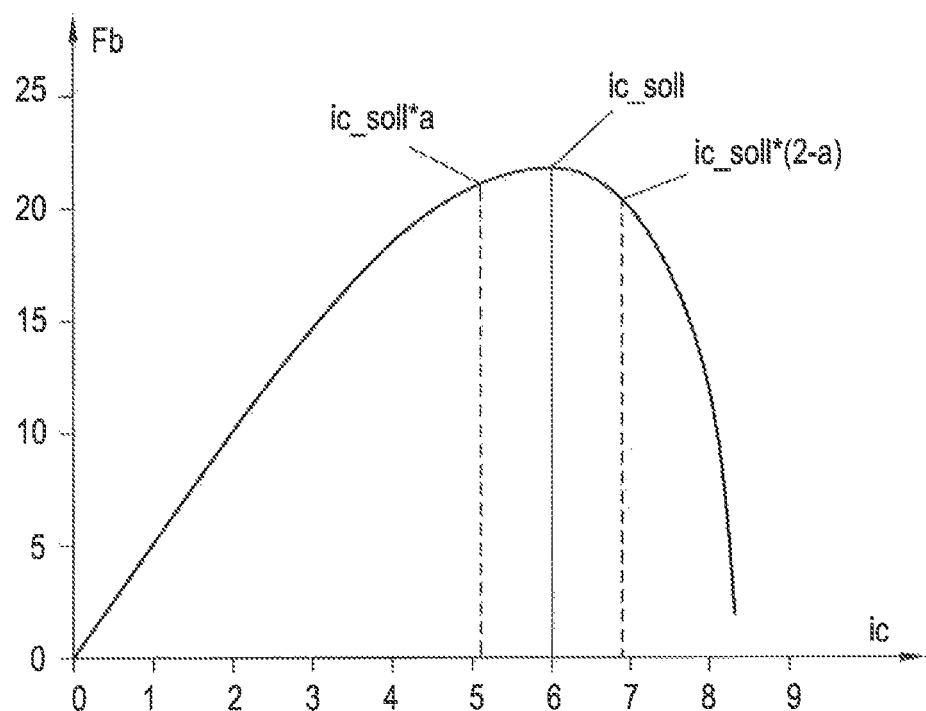
FIG. 4 illustrates an approximation of the braking force as a function of the short-circuit current.

FIG. 4 shows the approximated relationship of the braking force Fb as a function of the short-circuit current ic for a certain speed of the transport unit 1, wherein the abscissa representing the short-circuit current ic and the ordinate the effective braking force Fb. The optimum target short-circuit current ic_soll is also plotted and represents the short-circuit current ic, which gives a maximum braking force Fb since the driving force-forming short-circuit current component icq is maximized.

In order to determine the actual short-circuit current ic at the beginning of a braking operation, but also in each cycle after the start of the braking operation, all drive coils Sm, the drive coils Sm of a segment, or only those drive coils Sm (if known) coupled to the transport unit 1 can be short-circuited for a short time interval. The short-circuit current ic can be calculated as the vectorial total of the coil short-circuit currents icm that are measured.

FIG. 5 shows a typical period T in which short-circuit interval tc_ks and idle interval tc_ll alternate. The period T is assumed to be constant here, for example, but of course can also vary.

When a full bridge VB is used (see FIG. 2A), the switches S11, S21, S11', S21' are open in the idle interval tc_ll and the switches S21 and S21' or the switches S11 and S11' are switched through in the short-circuit interval tc_ks for a full short circuit. In the idle interval tc_ll, all four switches S11, S21', S11', S21 of the full bridge VB are opened. When using a half-bridge HB (see FIG. 2B), the switches S11 and S21 are open in the idle interval tc_ll and in the short-circuit interval tc_ks are alternately closed, for example in a 50/50 ratio.

As limiting cases, a short-circuit interval tc_ll of zero (i.e. an idle interval tc_ll in the amount of the period T) or a short-circuit interval tc_ll in the amount of the period T (and thus an idle interval tc_ll of zero) would be conceivable. However, the short-circuit interval tc_ll should advantageously not be at zero, but just above it, preferably at the minimum safety period, in particular in the case of a PWM short-circuit of a half-bridge HB.

The selection of the correct ratio of short-circuit interval tc_ks to idle interval tc_ll can be carried out by the short-circuit controller K, which can be connected upstream of the control unit R (as indicated in FIG. 1), or can be an integral part of the control unit R.

Advantageously, in the controlled short-circuit mode M three phases A, B, C are provided. In a short-circuit phase A, in which the short-circuit current ic is smaller than the target short-circuit current ic_soll multiplied by a factor a, ic≥ic_soll·a, the at least some of the drive coils Sm interacting with a transport unit 1 operate in a short circuit over each period T, i.e. permanently, since the actual short-circuit current ic is smaller than the target short-circuit current ic_soll. When using full bridges VB in the LLM controller 4, this can mean a full short-circuit, or when using a half-bridge HB in the LLM controller 4, a "PWM short circuit". This means that in the short-circuit phase A within each period T, the short-circuit interval tc_ks is maximized and the idle interval ic_ll is minimized. In this case, the short-circuit interval tc_ks can extend over the entire period T, whereby the idle interval tc_ll is zero. Basically, for the short-circuit phase A, a minimum duration for the idling phase tc_ll (i.e., a maximum duration for the short-circuit phase tc_ks) may be provided, which can correspond to a predefined minimum safety period. For example, for the one period T of 25 µs, the minimum duration of the idle phase tc_ll may correspond to a predefined minimum safety period, for example 500 ns.

In a mixed phase B, in which the short-circuit current ic is equal to or greater than the target short-circuit current ic_soll multiplied by a factor a, ic≥ic_soll·a and advantageously smaller than the target short-circuit current ic_soll multiplied by (2−a): ic<ic_soll·(2−a), the at least some of the drive coils Sm operate alternately in short circuit and idle. This means that in a period T short-circuit interval tc_ks and idle interval tc_ll alternate. In particular, the respective duration of short-circuit interval tc_ks and idle interval to_ll can be calculated within a period T for the mixed phase B via a third-order polynomial with an error deviation e_ic.

The error deviation e_ic represents the deviation of the short-circuit current ic from the target short-circuit current ic_soll.

In an idle phase C in which the short-circuit current is equal to or exceeds the target short-circuit current ic_soll multiplied by the term (2−a), ic≥ic_soll·(2−a), the at least some of the drive coils Sm are operated at idle. The short-circuit controller K maximizes the idle interval tc_ll and minimizes the short-circuit interval tc_ks. In this case, the idle interval tc_ll can extend over the entire period T, whereby the short-circuit interval tc_ks is zero. However, a minimum short-circuit interval tc_ks greater than zero or a maximum idle interval tc_ll smaller than the period T may also be provided. For example, if a factor a of zero is selected, then only the mixed phase B is used.

For example, if a factor a of one is selected, the operation takes place in the short-circuit phase A if the short-circuit current ic is less than the target short-circuit current ic_soll and the idle phase C if the short-circuit current ic is equal to or greater than the target short-circuit current ic_soll. Accordingly, there is no mixed phase B in this special case.

The factor a can be determined in advance or predetermined, with a factor of a=0.85 for short-circuit current control of a long-stator linear motor having proven to be particularly advantageous. The boundary between idle phase A and mixed phase B is shown in dashed lines in FIG. 4 for a factor a=0.85, as is the boundary between mixed phase B and short-circuit phase C.

Advantageously, in the mixing phase B, the at least some of the drive coils Sm are operated alternately over a short-circuit interval tc_ks in the short circuit mode and in idle mode over an idle interval tc_ll, the duration of the short-circuit interval tc_ks being determined for the duration of the idle interval tc_ll.

FIG. 6A shows a plot of the short-circuit current ic via the idling phase tc_ll, switching from the short-circuit phase A to the idle phase C via the mixed phase B. Here, the idle interval tc_ll is not quite zero even in the short circuit phase A, since a minimum duration is provided for the idle phase tc_ll. FIG. 6B shows a plot of the error deviation e_ via the idling phase tc_ll from the idling phase C via the second phase B into the first short-circuit phase A. Since a third order polynomial is used to calculate the idle interval tc_ll and the short-circuit interval tc_ks in the mixed phase B for the error deviation e_ic, soft transitions into and out of the mixed phase B can be achieved for the short-circuit current ic, with which noise in the short-circuit current ic can be kept low. Alternatively, it would be possible to provide no mixed phase B and to switch hard from the short-circuit phase A to the idling phase C or vice versa.

In FIG. 7, the temporal plot of a first short-circuit current ic1 for a permanent, or 50/50 PWM short circuit and a second short-circuit current ic2 generated according to the invention, is shown. For the first short-circuit current ic1 a maximum short circuit phase tc_ks chosen, i.e. a permanent phase A. In the lower part of FIG. 7 there is a temporal plot of a first braking force Fb1 which results from the first short-circuit current ic1 and a temporal plot of a second braking force Fb2, which results from the second short-circuit current ic2. It can be seen that the second braking force Fb2 is higher than the first braking force Fb1 directly after the start of the braking operation, although the second short-circuit current ic2 is less than the first short-circuit current id, a situation which results from an increased driving force-forming short-circuit current component icq in accordance with the invention. In addition, the vibration behavior of the second short-circuit current ic2 is improved.

The selection of the drive cons Sm controlled according to the controlled short-circuit mode M, can be fundamentally free. Thus, all drive coils Sn or some of the drive coils Sn can be switched to the controlled short-circuit mode M. Advantageously, the magnetically-coupled drive coils Sm can be switched to the controlled short-circuit mode M using the transport unit T1.

Which drive coils Sm are coupled to the transport unit 1 can be determined via the current position of the transport unit 1. This position detection can take place by suitable position sensors, which may already be provided on the long-stator linear motor, for example as described in AT 519 238 A1.

However, which coils Sm in the short-circuited state drive a coil short-circuit current icm (which is measured) can also be detected. From this it can be concluded which of the drive coils Sm are magnetically coupled to the transport unit 1.

If it is detected that the transport unit 1 continues to move during the braking operation in such a way that a further drive coil Sm present in the direction of motion x is coupled to the transport unit 1 (e.g. since a coil short-circuit current icm is induced), then this drive coil Sm can also be switched to the short-circuit mode M. As a rule, this has the consequence that a drive coil Sm is no longer coupled to the transport unit 1 counter to the direction of motion x, so that it no longer has to remain in short-circuit mode M. However, the fact that the drive coil Sm is no longer coupled to the transport unit 1 counter to the direction of motion x can also be detected via position sensors or via the non-induction of a coil short-circuit current icm. It can be seen that the last drive coil Sm coupled counter to the direction of motion x is no longer coupled to the transport unit 1, which indicates that the next coil Sm located in the direction of motion x is operated in the short-circuit mode M instead of the first-mentioned drive coil Sm.

Advantageously, the short-circuit current ic can be limited, for example to a threshold value icmax, by the short-circuit controller K. This can be done by switching from short circuiting to idle. Thus, it is possible to control the (average) short-circuit current ic—as long as enough kinetic energy is present in the transport unit 1.

The invention claimed is:

1. A method for controlling a plurality of drive coils of a long-stator linear motor, comprising:
   in a normal operation, the drive coils are energized such that a magnetic field coupled to a transport unit is moved along a direction of motion in order to move the transport unit along the direction of motion; and
   during a braking operation, the transport unit is switched to a controlled short-circuit mode in which at least some of the drive coils are short-circuited at least over a first time interval.

2. The method according to claim 1, wherein, in the controlled short-circuit mode, the at least some of the drive coils are operated at idle for at least a second time interval.

3. The method according to claim 2, wherein a total short-circuit current flowing through the drive coils is determined, wherein a target short-circuit current (ic_soll) with a maximum driving force-forming short-circuit current component icq is determined by a predetermined relationship, wherein in the controlled short-circuit mode,
   in a short-circuit phase in which the short-circuit current is less than the target short-circuit current (ic_soll), the at least some of the drive coils are operated short-circuited,
   in an idle phase, in which the short-circuit current reaches or exceeds the target short-circuit current (ic_soll), the at least some of the drive coils are operated at idle.

4. The method according to claim 3, wherein the predetermined relationship is as follows:

$$ic\_soll = \frac{1}{\sqrt{2}} \frac{\Psi}{L},$$

with $\Psi$, as main flux $\Psi$ and L as unsaturated inductance.

5. The method according to claim 2, wherein a total short-circuit current flowing through the drive coils is determined, wherein a target short-circuit current with a maximum driving force-forming short-circuit current component icq is determined by a predetermined relationship, wherein in the controlled short circuit mode,
   in a short-circuit phase in which the short-circuit current is less than the target short-circuit current multiplied by a factor (a), the at least some of the drive coils are operated short-circuited,
   in an intermediate phase in which the short-circuit current is equal to or greater than the target short-circuit current multiplied by a factor (a) and is less than the target short-circuit current multiplied by a term 2−a, the at least some of the drive coils are alternately operated short-circuited and in idle, and
   in an idle phase, in which the short-circuit current corresponds to or exceeds the target short-circuit current multiplied by the term 2−a, the at least some of the drive coils are operated at idle.

6. The method according to claim 5, wherein, in a mixing phase, each of the at least some of the drive coils is operated alternately short-circuited over a short-circuit interval and in idle over an idle interval, wherein the duration of the short-circuit interval and the duration of the idle interval are determined.

7. The method according to claim 6, wherein, in the mixing phase, the duration of the short-circuit interval to the duration of the idle interval is calculated via a third order polynomial and an error deviation.

8. The method according to claim 5, wherein the factor (a) of 0.85 is selected.

9. The method according to claim 2, wherein only the drive coils that are magnetically coupled with the transport unit are switched to the controlled short-circuit mode.

10. The method according to claim 9, wherein the drive coils that are magnetically coupled to the transport unit are determined by a position sensor.

11. The method according to claim 9, wherein the drive coils that are magnetically coupled to the transport unit are detected using a coil short-circuit current (icm) induced in the respective drive coil.

12. A long-stator linear motor (LLM) comprising:
   a plurality of drive coils; and
   at least one transport unit,
   wherein the drive coils are energized via a LLM control system, which is controlled by a coil controller, such that a magnetic field coupled to the transport unit is moved along a direction of motion in order to move the transport unit along the direction of motion, and
   wherein a short-circuit controller is provided which, during a braking operation of the transport unit, short-circuits at least some of the drive coils at least over a first time interval.

13. The long-stator linear motor according to claim 12, wherein the short-circuit controller is connected upstream of the coil controller and during the braking operation, the coil controller instructs the at least some of the drive coils to short circuit over at least one time interval.

14. A long-stator linear motor (LLM) comprising:
a plurality of drive coils;
at least one transport unit; and
an LLM control unit comprising one of a full bridge having four switches or a half bridge having two switches,
wherein, via the LLM control unit, coils of the plurality of drive coils are selectively energizable to generate a magnetic field coupled to the transport unit that is movable along a direction of motion to move the transport unit along the direction of motion, and
wherein, via the LLM control unit, a braking operation of the transport unit is effected by short-circuiting at least some of the drive coils at least over a first time interval.

15. The long-stator linear motor according to claim 14, wherein the LLM control unit comprises a half bridge having two switches, and
wherein the short-circuiting effected by the half bridge having two switches is a pulse width modulation short circuit in which the two switches are alternately switched.

\* \* \* \* \*